Patented Aug. 3, 1926.

1,594,804

UNITED STATES PATENT OFFICE.

HARRY V. WELCH, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

PROCESS OF MAKING A FRUIT-JUICE PRODUCT.

No Drawing. Application filed February 5, 1921. Serial No. 442,784.

This invention relates to the production of fruit juice powder, which is a finely divided dry product containing the solid constituents of fruit juice, for example, lemon juice, orange juice, or juice of any other fruit. Such fruit juice powder has been made by spray drying, that is to say, by spraying the juice into a current of heated air or gas, so as to cause rapid evaporation of the juice, the resulting solid products being suspended in the stream of air or gas and being collected by filtration, settling or, preferably, by electrical precipitation.

In the manufacture of fruit juice powder by the process known as "spray drying", it has commonly been the practice to conduct such operations at the maximum temperature which would be consistent with the recovery of the dust produced of certain ingredients, flavors and essential oils, and more important, at temperatures under which no deleterious effects, due to the prevailing temperature would be produced in the organic constituents comprising the solids resulting from the evaporation of the fruit juice; such, for example, as charring organic constituents resulting in an unpalatable or a "burnt" taste to the product, etc.

However, in the utilization of the process of electrostatic precipitation for the recovery of the fruit juice powder, carried or suspended in a gas stream, it has been found that certain objectionable mechanical features are present when operations are conducted at temperatures beyond a specific minimum which is defined as the softening point or temperature of the product derived from the evaporation of fruit juices.

There is present in fruit juices, in addition to the small percentage of mineral salts, organic acids, esters and oils, a certain amount of sugar usually of the character of glucose, which varies through a certain percentage range with the degree of ripeness, and the seasonable or climatic variations which have affected the growth and development of the fruit. The effect of this sugar constituent, or of some other constituent, which may be present, yields at a temperature of around 150° F., a dust or powder which, when recovered by the Cottrell process, produces a precipitate on the pipe or plate used as a collecting electrode, which is adherent, slightly gummy in character, and offers difficulty in removal by the ordinary methods of rapping or brushing the pipes or plates commonly resorted to in the Cottrell process operation.

I have found that at a temperature below, and up to and slightly over 100° F., that is, below the softening point, or temperature of the fruit powder, the dust deposited or collected by the Cottrell precipitator is solid or rigid in character and can be most satisfactorily removed as a fine pulverulent powder from the tubes or plates by common means in use; that is, brushing or rapping, and my invention is designed to take advantage of this discoverey in facilitating the production of fruit juice powder and improving the quality of the product.

Juices obtained from fruit of varying degrees of ripeness, or at different periods of the year, or under varying climatic conditions, vary greatly in the nature of and amount of solids obtained upon evaporation of the juice. For example, in the juice of lemons and oranges, the ratio and actual quantities of citric acid, a certain bitter constituent, and glucose sugar between green, just ripening and ripe fruit varies with the result that when same is used as a beverage of desired exactitude, the quantity of fruit juice powder used, or the addition required of sweetening agent, commonly sugar, varies between wide ranges.

In commercial practice, uniformity of a manufactured product is a prime consideration, and to provide for this, that is, to take up the variation in character of solids obtained and to secure the intimate form of mixture desired, I provide for adding to the fruit juice, previous to its entrance to the spray drying system, such quantities of sugar, glucose, or other soluble, palatable and desired constituent as will render the end product—a powder—of a desired and uniform character.

The dried powder recovered by means of the spray evaporator system for fruit juices contains constituents which, at ordinary temperature and humidity, are hydroscopic in nature. For this reason, the fruit juice powder or dust contained in a bottle or flask, soon becomes, upon opening it from day to day for the removal of a portion, sticky and gummy in nature, thus rendering the remainder difficult of removal and less desirable in appearance, and lessening, to a measurable extent, its commercial value and its unique characteristics and attractive features. The absorption of moisture by the powder also permits the development of ferments and tends towards decomposition—a condition which, of course, tends to decrease the value of the products and limits its field of convenient application and usefulness. The powder however, so long as it is not permitted to absorb moisture, is absolutely permanent in character and maintains its flavor and palatableness indefinitely.

To overcome this objection, I provide a method of preserving this fruit juice powder and of so subdividing it into small packages as, for example, an amount sufficient for one glass of refreshment, as to make it a novel and useful product for eatable, regulative and refreshment purposes.

My process is applicable to lemon juice, orange juice, or other fruit juice, and I may, in some cases, mix the juices derived from different fruits, to obtain a definite standard of composition. Thus, orange juice may be added to lemon juice to increase the sugar content and decrease the acidity thereof.

My invention may be carried out as follows:

The juice or solution extracted from fruit by pressure, or otherwise, is preferably mixed with a suitable water soluble material adapted to regulate or control the acidity, saccharinity, or other quality of the product, for example, sugar, glucose, or other soluble material, may be added to increase the sugar content, or a basic reagent, such as sodium carbonate, may be added to decrease the acidity. Moreover, for medicinal purposes, it may be desirable to introduce into the solution various other ingredients, such, for example, as magnesium oxide, or magnesium carbonate. In the case of lemon juice, this would result in the production of magnesium citrate in the solution. The resulting juice or solution may then be subjected to any preliminary operation, such as evaporation, or pre-heating, so as to bring it to a suitable condition for spray drying and is then sprayed into a stream of hot air, or gas, preferably pre-heated and pre-dried, so as to remove substantially all, or any desired portion of the water from the solution, leaving the solid constituents thereof in the form of a powder or dust, which is then collected by electrical precipitation. In carrying out this spray drying operation the heat is preferably controlled or regulated so as to be maintained at a temperature below the softening point of the powder containing the solid constituents of the fruit juice, together with any materials that may be added thereto, for example, the temperature may be maintained at or below 150° F. and above 100° F.

The product resulting from this operation is a dry dust-like powder, which, in general, will be more or less hydroscopic and, in order to protect the same, I pack it in capsules of any suitable size or material, for example, gelatin capsules, which are sealed so as to be water tight and which may be of such size as to contain any amount of the fruit juice powder sufficient to produce, when mixed with water, a glassful of the lemonade, or other beverage desired.

While I prefer to collect the fruit juice powder by electrical precipitation, it may also be collected by filtration, by passing the stream of gas containing the powder through bags, or other filtering media, and the production of the powder in dry or non-sticky condition is also of advantage in such methods of collection, as it prevents clogging of the filtering medium.

What I claim is:

1. The process for manufacture of fruit juice dust or powder, which consists in spraying fruit juice into a current of heated gases which are unsaturated with water, and collecting the resulting dry powder, the powder and the gases containing the same being maintained at a temperature below the softening point of the powder during the collecting operation.

2. The process for the manufacture of a fruit juice powder of uniform character, taste and palatability by introducing into the juice of varying acidity and sugar content as expressed from the fruit, sufficient sugar in solid condition to bring the sugar content of the juice to a definite standard, then subjecting the juice to spray drying operation by spraying the juice into a current of water absorbing gas, and collecting the resulting fruit juice powder, the collecting operation being performed at a temperature below the softening point of the fruit juice powder so as to maintain said powder in dry condition.

3. The process for the manufacture of a fruit juice powder which consists in mixing different kinds of fruit juice together with sugar to produce a definite standard complex solution, then subjecting the solution to spray drying operation by spraying the juice into a current of water absorbing gas, and collecting the resulting powder, the collecting operation being performed at a temperature below the softening point of the fruit juice powder so as to maintain the powder in non-sticky condition.

4. The process which consists in introducing into fruit juice containing citric acid a magnesia containing material to produce a solution containing citrate of magnesia, spray drying such solution to produce a powder, and collecting such powder at a temperature below the softening point thereof.

5. A process of producing a fruit juice powder which consists in introducing into fruit juice of varying acidity as expressed from the fruit, soluble acid neutralizing solids in sufficient amount to reduce the acidity of the fruit juice to a standard value, then subjecting the fruit juice to spray drying operation by spraying the juice into a current of water-absorbing gas, and collecting the resulting powder at a temperature below the softening point thereof.

6. In the manufacture of powders or dust from juices or solutions containing sugars of the order and nature of glucose, the spraying of the juice or solution into a gas stream undersaturated with respect to water vapor, whereby the water content of the juice or solution is converted into the vapor form, and the separation and collection of such dust at a temperature below the softening point thereof.

7. A process, as set forth in claim 6, wherein the temperature is maintained between 100° F and 150° F.

8. The process for the manufacture of a fruit juice powder of uniform character, taste, and palatability, by introducing into fruit juice of varying acidity and sugar content as expressed from the fruit, sufficient sugar in solid condition to bring the sugar content of the juice to a definite standard and sufficient soluble acid neutralizing solids to reduce the acidity of the juice to a definite standard, then subjecting the juice to spray drying operation by spraying the juice into a current of water absorbing gas and collecting the resulting powder at a temperature below the softening point thereof.

In testimony whereof I have hereunto subscribed my name this 31st day of January, 1921.

HARRY V. WELCH.